United States Patent
Blakemore et al.

(10) Patent No.: US 9,145,064 B2
(45) Date of Patent: Sep. 29, 2015

(54) BATTERY CELL CAPACITY BALANCING SYSTEM AND METHOD

(75) Inventors: Bruce Carvell Blakemore, Plymouth, MI (US); Allan Roy Gale, Livonia, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 13/192,518

(22) Filed: Jul. 28, 2011

(65) Prior Publication Data

US 2013/0030619 A1    Jan. 31, 2013

(51) Int. Cl.
  *B60L 9/00* (2006.01)
  *B60L 11/00* (2006.01)
  *H01M 6/42* (2006.01)
  *H02J 7/00* (2006.01)
  *B60L 11/18* (2006.01)

(52) U.S. Cl.
  CPC ........... *B60L 11/1862* (2013.01); *H02J 7/0016* (2013.01); *Y02T 10/705* (2013.01); *Y02T 10/7005* (2013.01); *Y02T 10/7044* (2013.01); *Y02T 10/7055* (2013.01)

(58) Field of Classification Search
  CPC ............... B60W 10/06; B60W 10/26; B60W 2510/244; Y10S 903/903; B60L 11/1861; B60L 11/1862; B60L 15/2045; B60L 11/1809; B60L 11/1868
  USPC .............................. 701/22; 320/128; 429/150
  See application file for complete search history.

(56) References Cited

U.S. PATENT DOCUMENTS

| | | | |
|---|---|---|---|
| 4,079,303 A * | 3/1978 | Cox | 320/119 |
| 5,615,129 A * | 3/1997 | Stich et al. | 700/297 |
| 5,659,237 A | 8/1997 | Divan et al. | |
| 5,782,880 A | 7/1998 | Lahtinen et al. | |
| 5,869,951 A | 2/1999 | Takahashi | |
| 6,114,835 A * | 9/2000 | Price | 320/118 |
| 6,451,463 B1 | 9/2002 | Tsai et al. | |
| 6,646,419 B1 | 11/2003 | Ying | |
| 7,091,700 B2 | 8/2006 | Kadouchi et al. | |
| 7,245,108 B2 | 7/2007 | Chertok et al. | |
| 7,274,170 B2 | 9/2007 | Benckenstein, Jr. et al. | |
| 7,489,106 B1 | 2/2009 | Tikhonov | |
| 8,207,740 B2 | 6/2012 | Lin et al. | |
| 8,493,031 B2 * | 7/2013 | Murao et al. | 320/132 |
| 2003/0152830 A1 | 8/2003 | Eaves | |
| 2006/0119319 A1 | 6/2006 | Sakurai et al. | |
| 2007/0257641 A1 | 11/2007 | Sada et al. | |
| 2008/0197707 A1 | 8/2008 | Chi Yang | |
| 2010/0261048 A1 | 10/2010 | Kim et al. | |
| 2011/0025258 A1* | 2/2011 | Kim et al. | 320/106 |
| 2011/0078092 A1 | 3/2011 | Kim et al. | |
| 2011/0093223 A1 | 4/2011 | Quet | |

FOREIGN PATENT DOCUMENTS

CN           102082453 A      6/2011

* cited by examiner

*Primary Examiner* — Behrang Badii
*Assistant Examiner* — Daniel L Greene
(74) *Attorney, Agent, or Firm* — David B. Kelley; Brooks Kushman P.C.

(57) ABSTRACT

A vehicle may include an electric machine that generates motive power for the vehicle, a plurality of cells that store energy for the electric machine, and at least one controller. The at least one controller may cause the cells to receive current for a period of time and, during the period of time, cause at least some of the cells to supply cell load current such that at the expiration of the period of time, the amount of energy stored by the cells is at least equal to a predetermined target energy level.

10 Claims, 4 Drawing Sheets

BATTERY CELL CAPACITY BALANCING SYSTEM AND METHOD

BACKGROUND

Vehicle battery rebalancing is performed to correct cell voltage imbalance conditions. The voltage of each of the cells is measured and the cell having the minimum voltage identified. All other cells are bled down via resistive circuitry associated with each cell until the other cells have a measured voltage approximately equal to the minimum. Continuous/periodic cell voltage measurements are taken during the bleed down process to monitor change in the cell voltages. Once all of the cell voltage readings are approximately equal, the battery is charged.

SUMMARY

A method for charging a vehicle battery including a plurality of cells may include causing the cells to receive current for a period of time and during the period of time, causing at least some of the cells to supply cell load current such that at the expiration of the period of time, the capacity in each of the cells is approximately equal.

A power system may include a plurality of cells and at least one controller configured to cause the cells to acquire charge for a period of time such that at the expiration of the period of time, the amount of Amp-hrs stored by each of the cells is approximately equal.

DETAILED DESCRIPTION

Figure 1:
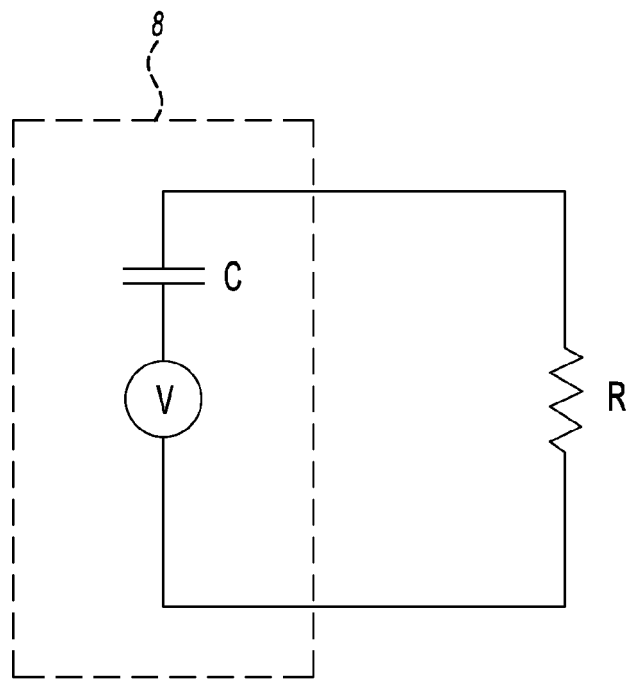
FIG. 1 is a schematic diagram of a battery cell and its resistive circuitry.

A manufacturer of alternatively powered vehicles (e.g., battery electric vehicles, etc.) may desire to provide vehicles that can be driven for a specified range after battery rebalancing/charging. The drive range of a battery powered vehicle depends on the amount of available energy stored by its battery. Conventional techniques for battery rebalancing attempt to make the battery cell voltages equal before charging the battery cells to a target voltage. For a given cell voltage, however, cell energy content can decrease over time due to cell aging. Hence, the amount of energy stored by the battery (and thus vehicle drive range) can decrease over time if the cells continue to be charged to the same target voltage.

Certain embodiments disclosed herein may provide systems and techniques that balance/charge a battery to achieve a specified vehicle drive range.

Cell Capacity

A battery cell's maximum capacity, $Ihr_{max}$, may be found according to the relationship $$Ihr_{max} = \frac{\Delta Ihr}{\Delta SOC} \quad (1)$$

where $\Delta Ihr$ is the change in capacity in the cell and $\Delta SOC$ is the change in state of charge of the cell. As an example, the SOC of a given cell may be determined before and after 1 A·hr of capacity is provided to it. Assuming a $\Delta SOC$ of 10% for this example, the cell's maximum capacity, $Ihr_{max}$, would be 10 Amp-hrs according to (1).

Cell Energy Content

A battery cell's energy content, $\epsilon$, may be approximated from the following sets of equations $$\epsilon = \int \rho \cdot dt \quad (2)$$

where $\rho$ is the power applied to the cell over time. $\rho$ may be written as $$\rho = v_m \cdot i \quad (3)$$

where $v_m$ is the (measured) voltage associated with the power stored and i is the current associated with the power stored. Substituting (3) into (2) yields $$\epsilon = \int v_m \cdot i \cdot dt \quad (4)$$

$v_m$ may be written as $$v_m = \Delta v + v_{min} \quad (5)$$

where $v_{min}$ is the voltage of the cell at 0% state of charge (e.g., 3.1 V) and $\Delta v$ is the difference between the voltage associated with the power stored and the voltage of the cell at 0% state of charge. Substituting (5) into (4) yields $$\epsilon = \int (\Delta v + v_{min}) i \, dt \quad (6)$$

$\Delta v$ may be written as $$\Delta v = i \cdot \frac{v_{max} - v_{min}}{Ihr_{max}} \cdot t \quad (7)$$

where $v_{max}$ is the voltage of the cell at full state of charge, $Ihr_{max}$ is the cell's maximum capacity, and t is the time over which the change in voltage occurs. Substituting (7) into (6) yields $$\epsilon = \int \left( \left( i \cdot \frac{v_{max} - v_{min}}{Ihr_{max}} \cdot t \right) + v_{min} \right) i \, dt \quad (8)$$

Integrating (8) yields $$\epsilon = i^2 \cdot \frac{v_{max} - v_{min}}{Ihr_{max}} \cdot \frac{t^2}{2} + v_{min} \cdot i \cdot t \quad (9)$$

i·t may be written as $$i \cdot t = Ihr \quad (10)$$

which is the capacity in the cell. Substituting (10) into (9) yields $$\epsilon = \frac{v_{max} - v_{min}}{Ihr_{max}} \cdot \frac{Ihr^2}{2} + v_{min} \cdot Ihr \quad (11)$$

Cell Capacity Needed to Provide Specified Energy Content

Assume, for example, that a battery pack includes a string of cells each with a different Amp-hr capacity due to manufacturing tolerances, age, temperature, etc. The same current would pass through all of the cells during a subsequent discharge of the series string. From (7), the cells with lesser Amp-hr capacity at the start of discharge would have greater cell voltages compared to those with greater Amp-hr capacity when charged to the same Amp-hrs. From (11), it can be seen that given two cells with the same number of Amp-hrs stored (the first with greater Amp-hrs maximum capability compared with the second), the second will deliver more energy if both are discharged.

Now assume, for example, that a given battery pack having 20 cells needs to store at least 30 kW·hrs of energy to support a drive range of 100 miles. That is, the sum of energies stored by the cells of the battery pack should be at least equal to 30 kW·hrs. (11) may then be evaluated for each of the cells. An initial value (e.g., 1 A·hr) for Ihr may be assumed, $v_{max}$ and $v_{min}$ are known by design, and $Ihr_{max}$ can be determined from (1). If the sum of the cell energies is less than, in this example, 30 kW·hrs, the value for Ihr may be incremented by, for example, 1 A·hr and (11) evaluated again for each of the cells iteratively until the sum of the cell energies is at least equal to 30 kW·hrs. The capacity value resulting in the sum of the cell energies being at least equal to 30 kW·hrs is the target cell capacity value.

Total Battery Pack Charge Time

Ihr from (11) may be written as $$Ihr = \Delta Ihr + Ihr_{initial} \quad (12)$$

where $Ihr_{initial}$ is the initial capacity in the cell (before cell balancing/charging) and Ihr is the difference in capacity in the cell before cell balancing/charging and after cell balancing/charging (to the target Ihr value). $Ihr_{initial}$ is proportional to the measured voltage of the cell. Hence, a look-up table mapping values of cell voltage to Ihr may be used to determine $Ihr_{initial}$ based on the initial measured cell voltage. ((7) may also be used to find the initial capacity by solving for i·t (cell capacity) and setting Lv equal to the measured voltage of a particular cell). Ihr for each cell may thus be found from (12).

The total charge time, $t_c$, (or time during which the cells are to receive current) for a battery pack may be found according to $$t_c = \frac{\Delta Ihr_{max}}{i_{chg}} \quad (13)$$

where $\Delta Ihr_{max}$ is the maximum of the $\Delta Ihr$ values determined from (12) and $i_{chg}$ is the charge current of the pack.

Cell Resistive Circuitry Activation Time

The duration of time, $t_{R\_act}$, during which a cell's resistive circuitry may be activated to cause the cell to supply a cell load current while the cell is receiving current (assuming $t_c$ is greater than $t_{R\_act}$) to achieve the target capacity may be found from the following sets of equations $$i_{hr\text{-}bleed} = \int \frac{v_{cell}}{R} \cdot dt \quad (14)$$

where $i_{hr\text{-}bleed}$ is the discharge Amp-hrs associated with the cell's resistive circuitry when activated, $v_{cell}$ is the cell voltage, and R is the resistance of the cell's resistive circuitry. $v_{cell}$ may be written as $$v_{cell} = \frac{v_{max} - v_{min}}{Ihr_{max}} \cdot Ihr \quad (15)$$

where $v_{max}$ is the voltage of the cell at full state of charge, $v_{min}$ is the voltage of the cell at 0% state of charge, $Ihr_{max}$ is the cell's maximum capacity, and Ihr is the capacity in the cell. Substituting (15) into (14) and integrating yields $$i_{hr\text{-}bleed} = \frac{\frac{v_{max} - v_{min}}{Ihr_{max}} \cdot Ihr}{R} \cdot t_{R\_act} \quad (16)$$

Rearranging (16) yields $$t_{R\_act} = \frac{i_{hr\text{-}bleed} \cdot R}{\frac{v_{max} - v_{min}}{Ihr_{max}} \cdot Ihr} \quad (17)$$

$i_{hr\text{-}bleed}$, R, $v_{max}$ and $v_{min}$ are known by design, $Ihr_{max}$ can be determined for each cell from (1), and Ihr can be found from (11) as discussed above.

Cell Energy Content Balancing/Charging

Figure 2:
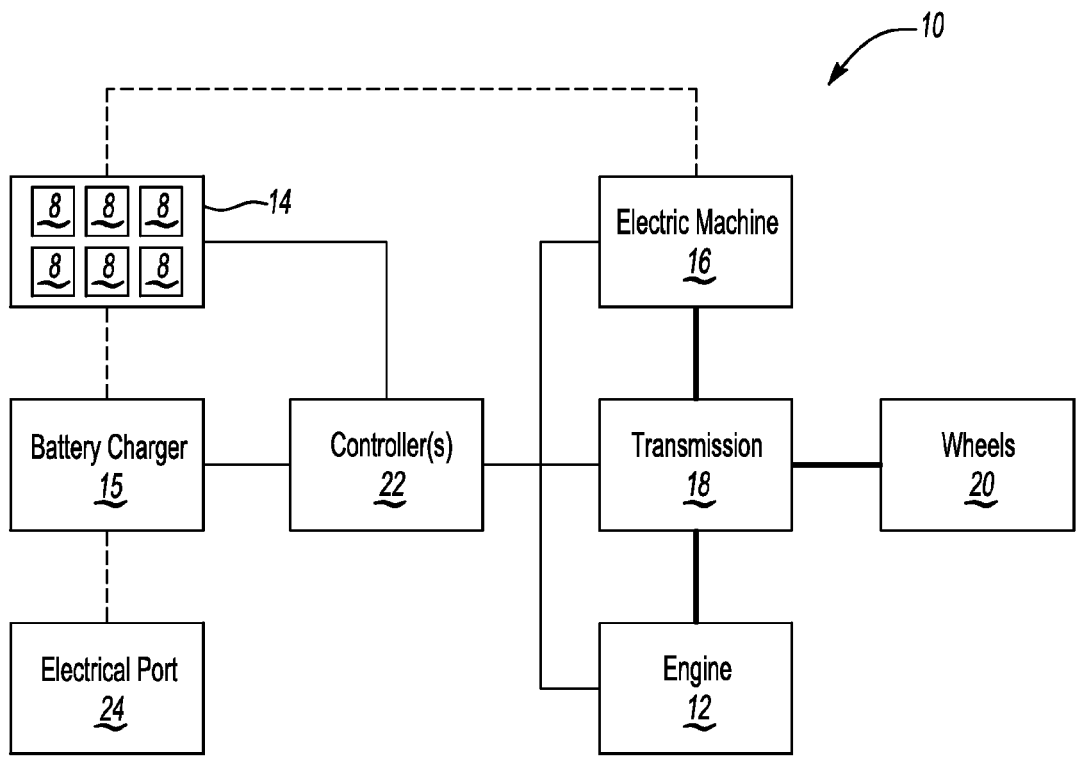
FIG. 2 is a block diagram of an alternatively powered vehicle.

Referring to FIG. 2, an embodiment of a plug-in hybrid electric vehicle (PHEV) 10 may include an engine 12, a plurality of cells 8 forming a traction battery 14, battery charger 15 and electric machine 16. The PHEV 10 may also include a transmission 18, wheels 20, controller(s) 22, and electrical port 24.

The engine 12, electric machine 16 and wheels 20 are mechanically connected with the transmission 18 (as indicated by thick lines) in any suitable/known fashion such that the engine 12 and/or electric machine 16 may drive the wheels 20, the engine 12 and/or wheels 20 may drive the electric machine 16, and the electric machine 16 may drive the engine 12. Other configurations, such as a battery electric vehicle (BEV) configuration, etc., are also possible.

The battery 14 may provide energy to or receive energy from the electric machine 16 (as indicated by dashed line). The battery 14 may also receive energy from a utility grid or other electrical source (not shown) via the electrical port 24 and battery charger 15 (as indicated by dashed line).

The controller(s) 22 are in communication with and/or control the engine 12, battery 14, battery charger 15, electric machine 16, and transmission 18 (as indicated by thin lines).

Figure 3:
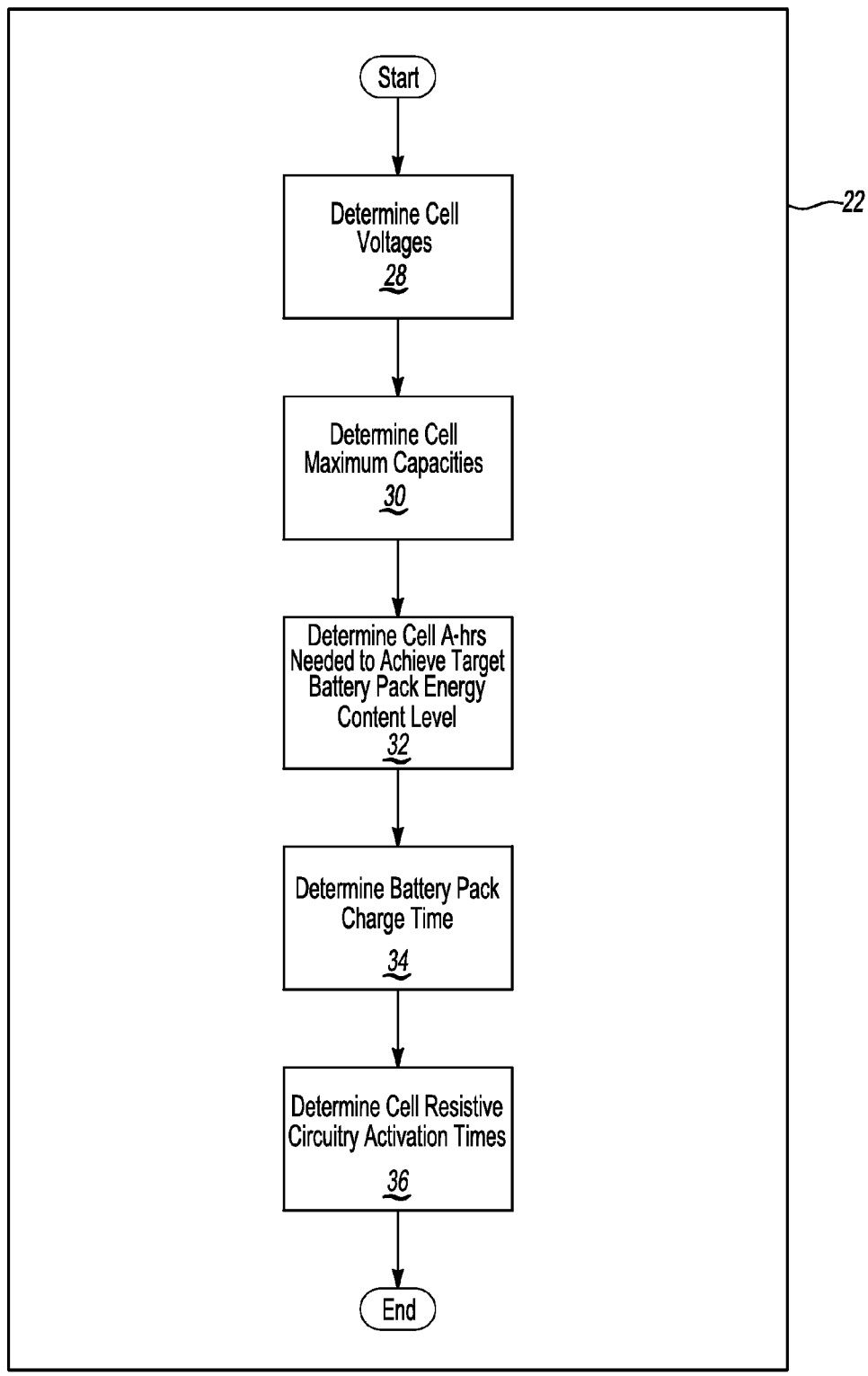
FIG. 3 is a flow chart illustrating an algorithm for determining times associated with rebalancing/charging the battery of FIG. 2.

Referring to FIGS. 2 and 3, the controller(s) 22 may determine (e.g., measure, read, etc.) the voltages of each of the cells 8 at operation 28. At operation 30, the controllers 22 may determine the maximum capacity of each of the cells 8 using, for example, the techniques described with respect to (1). At operation 32, the controller(s) 22 may determine the Amp-hrs needed in each of the cells to support a target drive range using, for example, the techniques described with respect to (11). At operation 34, the controller(s) 22 may determine the charge time for the battery pack 14 using, for example, the techniques described with respect to (13). At operation 36, the controller(s) 22 may determine each of the cell's resistive circuitry activation time using, for example, the techniques described with respect to (17).

Figure 4A:
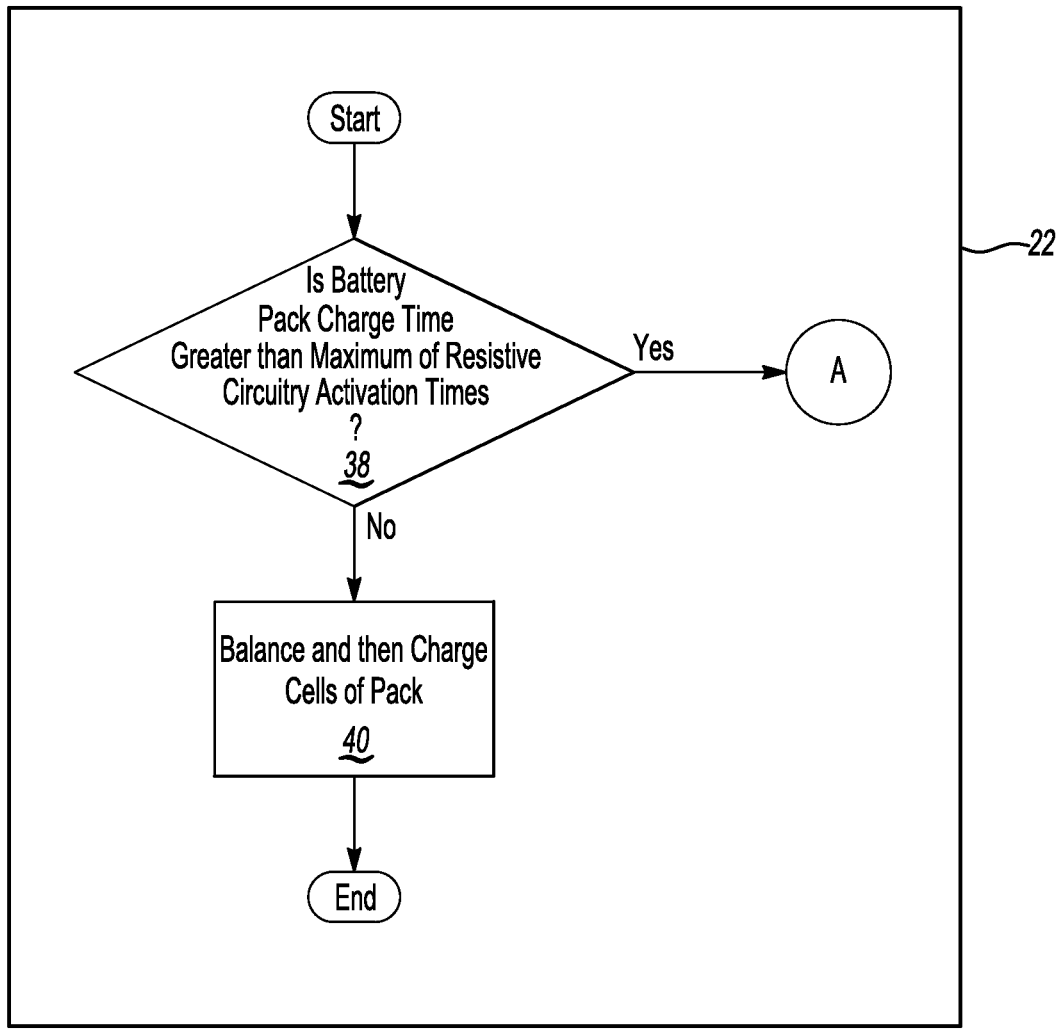
FIGS. 4A and 4B are flow charts illustrating an algorithm for rebalancing/charging the battery of FIG. 2.
Figure 4B:
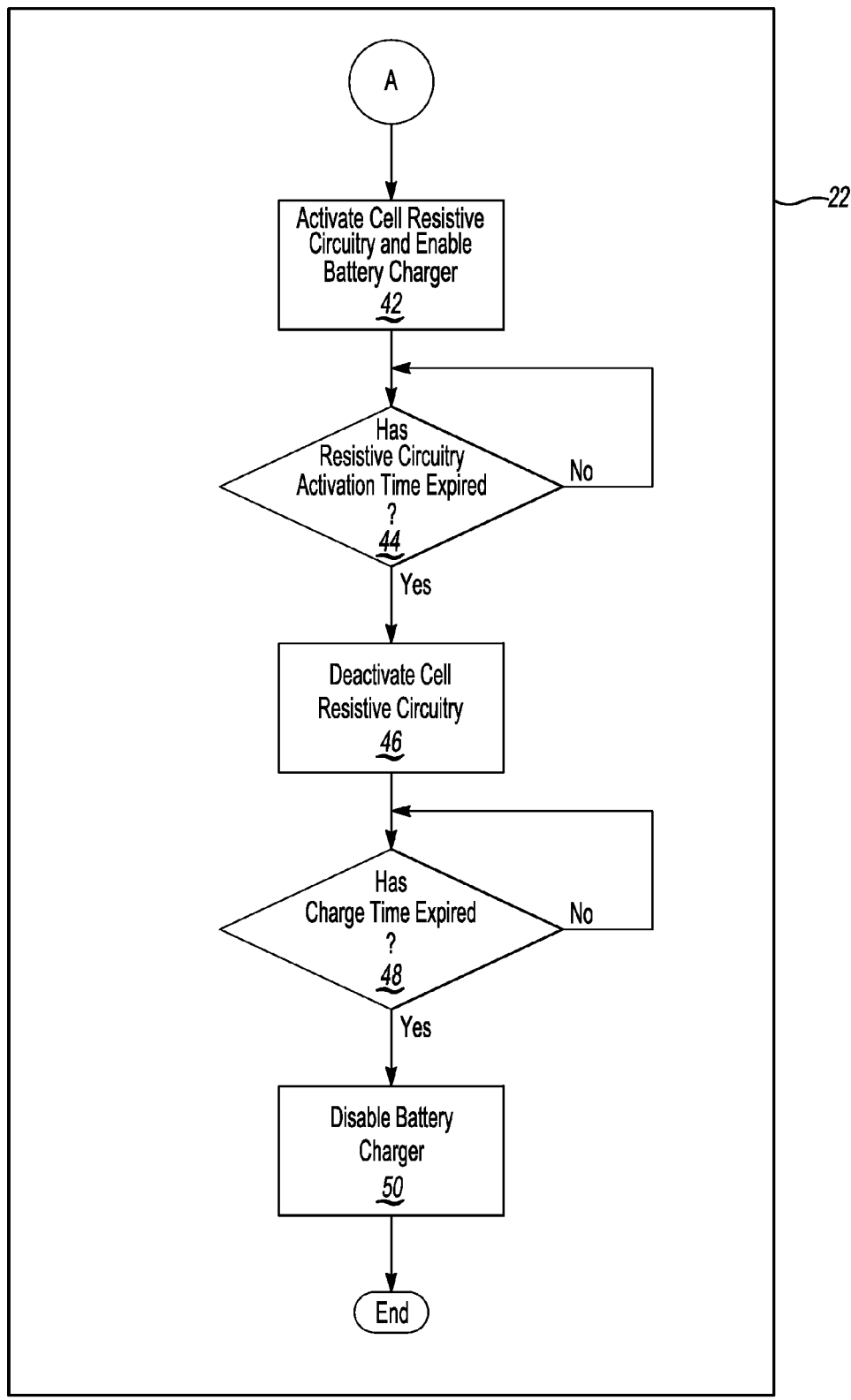

Referring to FIGS. 2 and 4A, the controller(s) 22 may determine, at operation 38 whether the pack charge time determined at operation 34 (FIG. 3) is greater than the maximum of the resistive circuitry activation times determined at operation 36 (FIG. 3). If no, the controller(s) 22 may first balance and then charge the cells 8 of the battery pack 14 at operation 40 using any suitable/known technique. If yes, referring to FIGS. 2 and 4B, the controller(s) 22 may activate, for each of the cells 8, the resistive circuitry and enable the battery charger 15 at operation 42. At operation 44, the controller(s) 22 may determine whether, for each of the cells 8, the cell's resistive circuitry activation time has expired. If no, the algorithm returns to operation 44. That is, for any of the cells 8 whose resistive circuitry activation time has yet to expire, the algorithm returns to operation 44. If yes, the controller(s) 22 may deactivate the cell resistive circuitry at operation 46. That is, for any of the cells 8 whose resistive circuitry activation time has expired, the controller(s) 22 may deactivate their resistive circuitry.

Once the resistive circuitry for all of the cells 8 has been deactivated, the controller(s) 22, at operation 48, may determine whether the battery pack charge time has expired. If no, the algorithm returns to operation 48. If yes, the algorithm may disable the battery charger 15 at operation 50. The cells 8 of the battery pack 14 have thus been balanced/charged to a target capacity sufficient to support a desired drive range.

The algorithms disclosed herein may be deliverable to/implemented by a processing device, such as the battery charger 15 or controller(s) 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
an electric machine configured to generate motive power for the vehicle;
a battery including a plurality of cells configured to store energy for the electric machine; and
at least one controller configured to cause the cells to receive current for a predetermined period of time and, during the predetermined period of time, to cause at least some of the cells to each also supply cell load current for a predetermined duration such that upon expiration of the predetermined period of time, an amount of Amp·hours stored by each of the cells is approximately equal to a common target, wherein at least some of the predetermined durations are different.

2. The vehicle of claim 1 wherein, for each of the at least some of the cells, the predetermined duration is based on an initial Amp·hours stored in the cell.

3. A method for charging cells of a battery comprising:
by a controller,
causing the cells to receive current for a predetermined period of time; and
during the predetermined period of time, causing at least some of the cells to each also supply cell load current for a predetermined duration such that upon expiration of the predetermined period of time, an Amp·hours stored in each of the cells is approximately equal to a common target.

4. The method of claim 3 wherein the period of time is based on a difference between the common target and a minimum of initial Amp·hours stored in each of the cells.

5. The method of claim 3 wherein each of the durations is based on an initial Amp·hours stored in a corresponding cell.

6. The method of claim 3 wherein upon the expiration of the predetermined period of time, an amount of energy stored by the cells is at least equal to a predetermined target energy level.

7. A power system comprising:
a battery including a plurality of cells; and
at least one controller configured to cause the cells to acquire charge for a period of time such that upon expiration of the period of time, an amount of Amp·hours stored by each of the cells is approximately equal to a predetermined common target.

8. The system of claim 7 wherein a rate at which charge is acquired by the cells is different among at least some of the cells for at least a portion of the period of time.

9. The system of claim 7 wherein the period of time is based on a difference between the common target and a minimum of initial Amp·hours stored in each of the cells.

10. The system of claim 7 wherein upon the expiration of the period of time, an amount of energy stored by the cells is at least equal to a predetermined target energy level.

* * * * *